United States Patent
Chiu et al.

(10) Patent No.: US 10,225,782 B2
(45) Date of Patent: Mar. 5, 2019

(54) WIRELESS COMMUNICATION DEVICE AND OPERATING METHOD USING THE SAME

(71) Applicant: INDUSTRIAL TECHNOLOGY RESEARCH INSTITUTE, Hsinchu (TW)

(72) Inventors: Yu-Min Chiu, Hsinchu (TW); Da-Chiang Pan, Taoyuan (TW); Fang-Ching Ren, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 270 days.

(21) Appl. No.: 14/985,902

(22) Filed: Dec. 31, 2015

(65) Prior Publication Data

US 2017/0164259 A1   Jun. 8, 2017

(30) Foreign Application Priority Data

Dec. 8, 2015   (TW) .............................. 104141138 A (51) Int. Cl.
*H04W 36/00* (2009.01)
*H04W 36/30* (2009.01)
(Continued)

(52) U.S. Cl.
CPC ........... *H04W 36/30* (2013.01); *H04W 36/14* (2013.01); *H04W 88/06* (2013.01);
(Continued)

(58) Field of Classification Search
CPC ..... H04W 36/30; H04W 88/06; H04W 36/14; H04W 48/18; H04W 84/12; H04W 72/1215; H04L 43/16; H04L 43/0829
See application file for complete search history.

(56) References Cited

U.S. PATENT DOCUMENTS 7,215,677 B2   5/2007   Lung
7,903,646 B2   3/2011   Ikeda
(Continued)

FOREIGN PATENT DOCUMENTS

CN   102204386 A   9/2011
TW   I487349 B   6/2015

OTHER PUBLICATIONS

Taiwanese Office Action dated Jan. 24, 2017.
(Continued)

*Primary Examiner* — Phuc H Tran
(74) *Attorney, Agent, or Firm* — Rabin & Berdo, P.C.

(57) ABSTRACT

A wireless communication device includes a first wireless transceiving interface, a second wireless transceiving interface and a resource allocation controller. The first wireless transceiving interface is adapted to a first network architecture. The second wireless transceiving interface is adapted to a second network architecture, wherein a connection scheme of the first network architecture is more reliable than that of the second network architecture. The resource allocation controller transceives data related to the second wireless transceiving interface selectively through the first wireless transceiving interface or the second wireless transceiving interface according to a connection status information associated with the second wireless transceiving interface.

48 Claims, 5 Drawing Sheets

(51) Int. Cl.
  *H04W 36/14*   (2009.01)
  *H04W 88/06*   (2009.01)
  *H04L 12/26*   (2006.01)
  *H04W 72/12*   (2009.01)
  *H04W 84/12*   (2009.01)
  *H04W 48/18*   (2009.01)

(52) U.S. Cl.
  CPC .......... *H04L 43/0829* (2013.01); *H04L 43/16* (2013.01); *H04W 48/18* (2013.01); *H04W 72/1215* (2013.01); *H04W 84/12* (2013.01)

(56) References Cited

U.S. PATENT DOCUMENTS

| | | | |
|---|---|---|---|
| 8,458,353 | B2 | 6/2013 | Krishnaswamy et al. |
| 2011/0040888 | A1 | 2/2011 | Krishnaswamy et al. |
| 2013/0155851 | A1 | 6/2013 | Koodli et al. |
| 2013/0182601 | A1 | 7/2013 | Bandyopadhyay et al. |
| 2013/0242843 | A1* | 9/2013 | Kojima ................... H04W 4/06 370/312 |
| 2013/0242897 | A1 | 9/2013 | Meylan et al. |
| 2014/0029527 | A1* | 1/2014 | Okuda ................ H04W 72/085 370/329 |
| 2014/0175507 | A1 | 6/2014 | Moroda et al. |
| 2014/0269275 | A1 | 9/2014 | Jun et al. |
| 2014/0313877 | A1 | 10/2014 | Gao |
| 2014/0317688 | A1 | 10/2014 | Zhang et al. |
| 2015/0245409 | A1* | 8/2015 | Medapalli ............. H04W 76/04 370/329 |

OTHER PUBLICATIONS

Jong-Ok Kim, "Feedback-Based Traffic Splitting for Wireless Terminals with Multi-Radio Devices", IEEE Transactions on Consumer Electronics, vol. 56, No. 2, May 2010.

Shivani Sud et al., "Enabling Rapid Wireless System Composition through Layer-2 Discovery" IEEE Network, vol. 22, Issue 4, pp. 14-20, Jul.-Aug. 2008.

Najah Abu Ali, "Quality of Service in 3GPP R12 LTE-Advanced", IEEE Communication Magazine, vol. 51, Issue 8, pp. 103-109, Aug. 2013.

Joachim Sachs et al., "Future Wireless Communication based on Multi-Radio Access"., Wireless World Research Forum Meeting, Jan. 2, 2011.

"The LTE Network Architecture; A comprehensive toturial", Alcatel-Lucent, 2009.

Allen L. Ramaboli et al., "Bandwidth aggregation in heterogeneous wireless networks: A survey of current approaches and issues", Journal of Network and Computer Applications, Jun. 13, 2012.

\* cited by examiner

WIRELESS COMMUNICATION DEVICE AND OPERATING METHOD USING THE SAME

This application claims the benefit of Taiwan application Serial No. 104141138, filed Dec. 8, 2015, the disclosure of which is incorporated by reference herein in its entirety.

TECHNICAL FIELD

The disclosure relates to a wireless communication device for heterogeneous-network wireless interface control and an operating method using the same.

BACKGROUND

Recently, WiFi technology has been widely used in various electric products. An electric device with WiFi capabilities, such as a smart phone, a personal computer, a panel computer, a laptop and a game console, may access a network through a WiFi Access Point (AP). However, as the number of users connecting to the WiFi AP increases, the probability of data collision becomes higher. This not only wastes wireless radio resources, but it also reduces the data throughput of a system.

Therefore, how to provide a wireless communication device and an operating method using the same which are capable of increasing the system data throughput and improving the service quality for the users has become a prominent task for the industries.

SUMMARY

The disclosure relates to a wireless communication device and an operating method using the same, which utilize heterogeneous-network interface control to enable a network being relatively reliable to support another network being relatively less reliable, so the data throughput of a system can be increased, and the service quality for the users can be improved.

According to an embodiment of the present disclosure, a wireless communication device is provided. The wireless communication device includes a first wireless transceiving interface, a second wireless transceiving interface and a resource allocation controller. The first wireless transceiving interface is adapted to a first network architecture. The second wireless transceiving interface is adapted to a second network architecture, wherein a connection scheme of the first network architecture is more reliable than that of the second network architecture. The resource allocation controller transceives data related to the second wireless transceiving interface selectively through the first wireless transceiving interface or the second wireless transceiving interface according to a connection status information associated with the second wireless transceiving interface.

According to an embodiment of the present disclosure, a wireless communication device is provided. The wireless communication device includes a first wireless transceiving interface, a second wireless transceiving interface, and a resource allocation controller. The first wireless transceiving interface is adapted to a first network architecture. The second wireless transceiving interface is adapted to a second network architecture, wherein a connection scheme of the first network architecture is more reliable than that of the second network architecture. The resource allocation controller transceives a connection status information associated with the second wireless transceiving interface through the first wireless transceiving interface, and transceives data related to the second wireless transceiving interface selectively through the first wireless transceiving interface or the second wireless transceiving interface.

According to an embodiment of the present disclosure, an operating method of a wireless communication device is provided. The operating method includes steps of: providing a first wireless transceiving interface adapted to a first network architecture; providing a second wireless transceiving interface adapted to a second network architecture, wherein a connection scheme of the first network architecture is more reliable than that of the second network architecture; and transceiving data related to the second wireless transceiving interface selectively through the first wireless transceiving interface or the second wireless transceiving interface according to a connection status information associated with the second wireless transceiving interface.

According to an embodiment of the present disclosure, an operating method of a wireless communication device is provided. The operating method includes steps of: providing a first wireless transceiving interface adapted to a first network architecture; providing a second wireless transceiving interface adapted to a second network architecture, wherein a connection scheme of the first network architecture is more reliable than that of the second network architecture; transceiving a connection status information associated with the second wireless transceiving interface through the first wireless transceiving interface, and transceiving data related to the second wireless transceiving interface selectively through the first wireless transceiving interface or the second wireless transceiving interface.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments of the present invention are disclosed below with reference to accompanying drawings, but not every embodiment is illustrated in accompanying drawings. In practical application, the present invention can have different variations and is not limited to the embodiments exemplified in the specification. A number of embodiments are disclosed in the present disclosure to meet the statutory requirements. Designations common to the accompanying drawings are used to indicate identical or similar elements.

Figure 1:
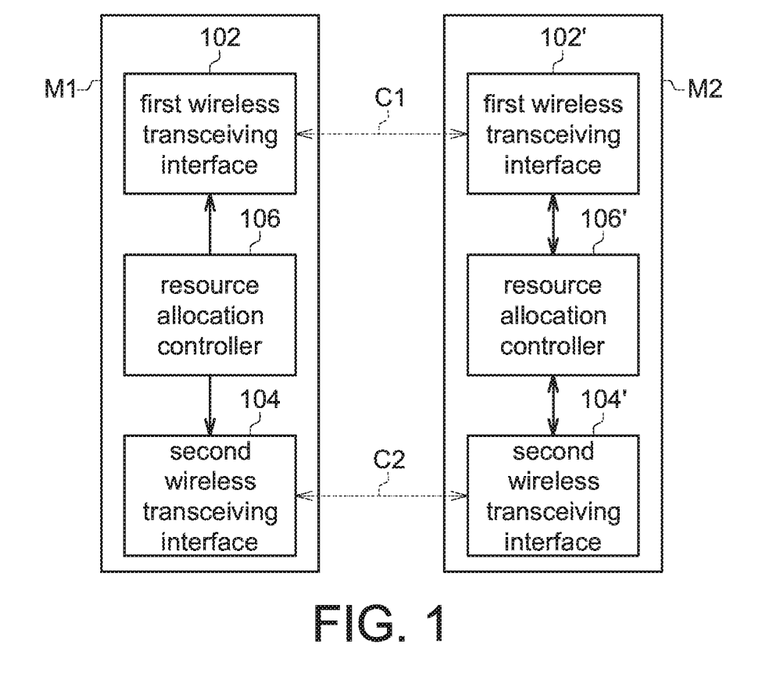
FIG. 1 shows a schematic diagram in which a plurality of wireless communication devices transceive data according to an embodiment of the present disclosure.

FIG. 1 shows a schematic diagram in which a plurality of wireless communication devices M1, M2 transceive data according to an embodiment of the present disclosure. The wireless communication device M1 includes a first wireless transceiving interface 102, a second wireless transceiving interface 104 and a resource allocation controller 106. The wireless communication device M2 may transmit/receive data to/from the wireless communication device M1, and correspondingly include a first wireless transceiving interface 102', a second wireless transceiving interface 104' and a resource allocation controller 106'. The wireless communication device M1 may be a wireless base station such as an Evolved Node B (eNB). The wireless communication device M2 may be an User Equipment (UE). The wireless communication devices M1, M2 may be connected to each other through at least two heterogeneous networks. As shown in FIG. 1, the first wireless transceiving interface 102 of the wireless communication device M1 may transmit/receive data to/from the first wireless transceiving interface 102' of the wireless communication device M2 through the channel C1. The second wireless transceiving interface 104 of the wireless communication device M1 may transmit/receive data to/from the second wireless transceiving interface 104' of the wireless communication device M2 through the channel C2. The channel C1 may be, but not limited to, a Long Term Evolution (LTE) based channel. The channel C2 may be, but not limited to, a WiFi based channel. It is noted that although the communication system illustrated in FIG. 1 is exemplified by only two wireless communication devices M1, M2, the present disclosure is not limited thereto. In other embodiments, the communication system may include one or more wireless communication devices M1 and one or more wireless communication devices M2.

In the embodiments of the present disclosure, the first wireless transceiving interface 102/102' is adapted to a first network architecture, and the second wireless transceiving interface 104/104' is adapted to a second network architecture, wherein the connection scheme of the first network architecture is more reliable than that of the second network architecture. For example, the first network architecture is a network architecture based on such as LTE, Wideband Code Division Multiple Access (WCDMA), High Speed Packet Access (HSPA) or LTE-A, and the second network architecture is a network architecture based on such as Wireless Local Area Network (WLAN) (e.g., WiFi), Wireless Personal Area Network (WPAN), or other non-cellular radio access network.

The resource allocation controller 106/106' controls the data transceiving of the first wireless transceiving interface 102/102' and that of the second wireless transceiving interface 104/104'. For example, the resource allocation controller 106' may control the first wireless transceiving interface 102' to transceive connection status information associated with the second wireless transceiving interface 104' when the wireless communication device M2 (UE side) receives data from the wireless communication device M1 (base station side). Correspondingly, when the resource allocation controller 106 of the wireless communication device M1 (base station side) receives the connection status information associated with the second wireless transceiving interface 104, it may transceive data associated with the second wireless transceiving interface 104 selectively through the first wireless transceiving interface 102 or the second wireless transceiving interface 104 according to the received connection status information.

For illustration, in the following example, the first wireless transceiving interface 102/102' is exemplified as a LTE transceiving interface, and the second wireless transceiving interface 104/104' is exemplified as a WiFi transceiving interface. The wireless communication device M2 (UE side) may report WiFi connection status information to the wireless communication device M1 (base station side) through the LTE transceiving interface being relatively reliable. Or, the wireless communication device M1 may detect the WiFi connection status and evaluate the connection quality of the channels C1, C2, to select a suitable transceiving interface to retransmit the WiFi data. Because the WiFi connection status can be reported based on a relatively reliable transceiving scheme, or be detected directly by the wireless communication device M1 (base station side), the transceiving interface suitable to retransmit the WiFi data can then be selected based on the connection quality. For example, it may utilize the LTE interface to retransmit all or part of the packets. In this manner, not only can the reliability of WiFi transceiving be improved, but the probability of data collision can be reduced.

In an embodiment, the resource allocation controller 106 of the wireless communication device M1 may calculate a packet loss rate according to the connection status information, and select using the first wireless transceiving interface 102 or the second wireless transceiving interface 104 to retransmit data according to the packet loss rate. For example, when the packet loss rate is larger than or equal to a threshold PLR, which indicates that the connection quality is poor, the resource allocation controller 106 may select the first wireless transceiving interface 102 being relatively reliable to retransmit data. On the contrary, when the packet loss rate is lower than the threshold PLR, which indicates that the connection quality is in a tolerated range, the resource allocation controller 106 may allow the second wireless transceiving interface 104 being relatively less reliable to perform the data retransmission. The abovementioned packet loss rate may be defined as, for example, the ratio of the number of lost packets to the total number of transmitted packets. Table 1 illustrates an exemplary corresponding relationship between the packet loss rate and each communication example under LTE standard.

TABLE 1

| QoS Class Identifier (QCI) Level | Packet Delay | Packet Loss Rate | Example |
| --- | --- | --- | --- |
| 1 | 100 ms | $10^{-2}$ | VoIP call |
| 2 | 150 ms | $10^{-3}$ | Video call |
| 3 | 50 ms | | Online gaming (Real Time) |
| 4 | 300 ms | $10^{-6}$ | Video streaming |
| 5 | 100 ms | | IMS signaling |
| 6 | 300 ms | | Video, TCP based services e.g., email, chat, ftp etc. |
| 7 | 100 ms | $10^{-3}$ | Voice, Video, Interactive gaming |
| 8 | 300 ms | $10^{-6}$ | Video, TCP based services e.g., email, chat, ftp etc. |
| 9 | | | |

For example, the resource allocation controller 106 may utilize the second wireless transceiving interface 104 to retransmit data when the packet loss rate meets a certain QCI level.

In an embodiment, the wireless communication device M1 may assign each packet a sequence number. Based on the schedule developed by the resource allocation controller 106, these packets will be transmitted to the wireless communication device M2 through the first wireless transceiving interface 102 or the second wireless transceiving interface 104, or, parts of the packets will be transmitted through the first wireless transceiving interface 102, and the rest will be transmitted through the second wireless transceiving interface 104. After receiving the packets, the wireless communication device M2 may rearrange the sequence numbers of the packets to find out which packets are lost, and report the result in the form of the connection status information to the wireless communication device M1. By using the connection status information, the wireless communication device M1 may know which packets are lost and the number of these lost packets, so the packets to be retransmitted can be determined.

Figure 2:
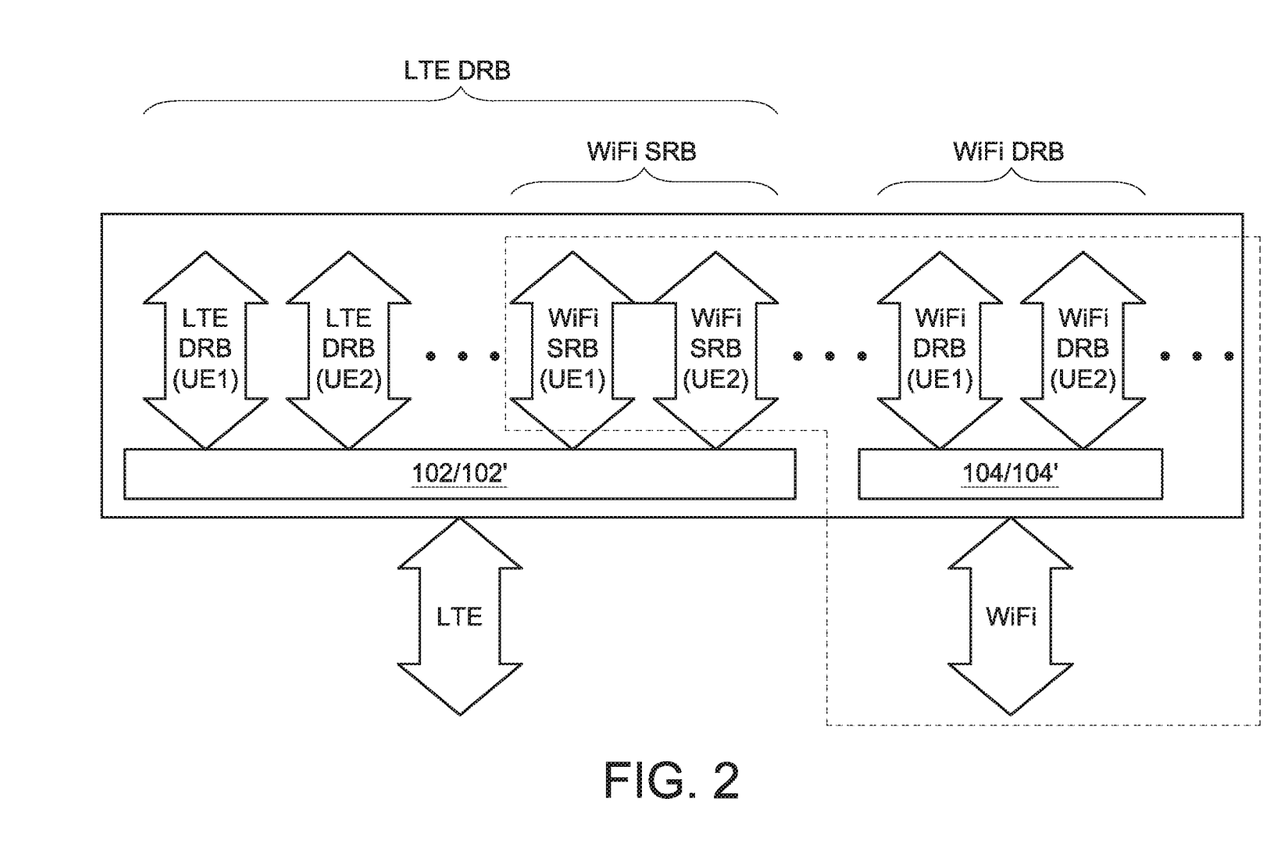
FIG. 2 shows a schematic diagram of the radio resource allocation of the wireless communication device according to an embodiment of the present disclosure.

FIG. 2 shows a schematic diagram of the radio resource allocation of the wireless communication device M1/M2 according to an embodiment of the present disclosure. In the example of FIG. 2, two types of data channels are defined for the second wireless transceiving interface 104/104': the first one is WiFi Data Radio Bearer (DRB) for transceiving the WiFi data, and the second one is WiFi Signal Radio Bearer (SRB) for transceiving the WiFi connection status information or the retransmitted WiFi data. The WiFi DRB may utilize the original WiFi radio channel to transmit the WiFi data, and the WiFi SRB may borrow the LTE based DRB (LTE DRB) provided by the first wireless transceiving interface 102/102' to transmit the WiFi connection status information or the retransmitted WiFi data.

As shown in FIG. 2, the first wireless transceiving interface 102/102' provides a plurality of LTE DRBs, wherein at least one of the LTE DRBs may be used as the WiFi SRB, for transceiving the WiFi connection status information or the retransmitted WiFi data associated with the second wireless transceiving interface 104/104'. The second wireless transceiving interface 104/104' may utilize the WiFi DRB to transmit the WiFi data. In the example, an UE (e.g., UE1 or UE2) may be allocated one or more LTE DRBs, but only one corresponding WiFi SRB and one corresponding WiFi DRB.

However, the present disclosure is not limited thereto. In an embodiment, the wireless communication device M1 (base station side) may receive uplink data from the wireless communication device M2 (UE side) through the first wireless transceiving interface 102, and transmit downlink data to the wireless communication device M2 (1) selectively through the first wireless transceiving interface 102 or the second wireless transceiving interface 104, or (2) totally through the second wireless transceiving interface 104 to prevent the WiFi traffic congestion.

Figure 3A:
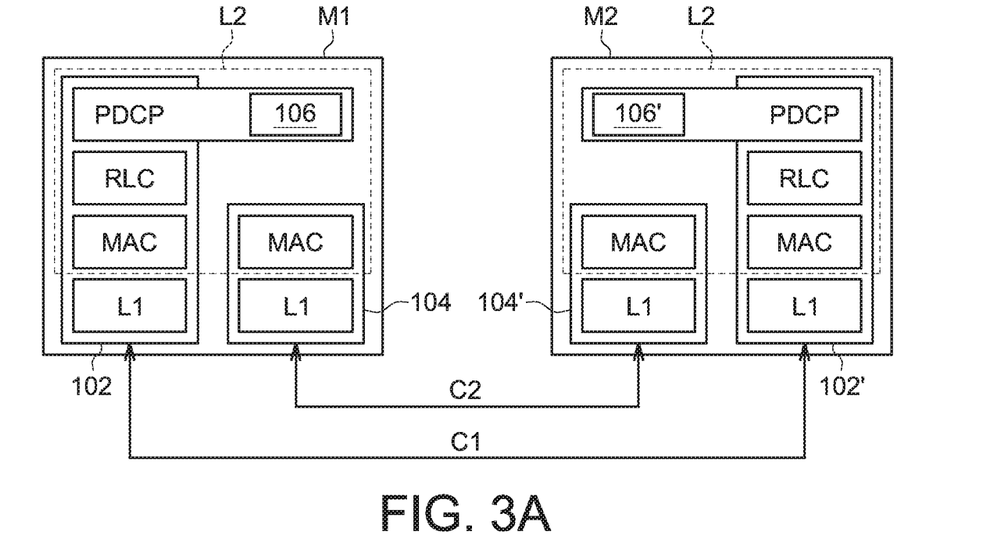
FIG. 3A shows the protocol stack of the wireless communication device according to an embodiment of the present disclosure.

FIG. 3A shows the protocol stack of the wireless communication device M1, M2 according to an embodiment of the present disclosure. For illustration, in this embodiment, the first wireless transceiving interface 102/102' is exemplified as the LTE transceiving interface, and the second wireless transceiving interface 104/104' is exemplified as the WiFi transceiving interface, but the present disclosure is not limited thereto.

The protocol stack of the first wireless transceiving interface 102/102' (e.g., the LTE transceiving interface) may be defined as having multiple layers, e.g., a first layer L1 and a second layer L2 shown in FIG. 3A. The first layer L1 includes, for example, protocol(s) for physical layer. The second layer L2 includes, for example, Packet Data Convergence Protocol (PDCP), Radio Link Control (RLC) and Media Access Control (MAC).

The protocol stack of the second wireless transceiving interface 104/104' (e.g., the WiFi transceiving interface) may be defined as having the first layer L1 and the second layer L2. The first layer L1 of the second wireless transceiving interface 104/104' includes the physical layer protocol, and the second layer L2 includes the MAC module.

In the example of FIG. 3A, the resource allocation controller 106/106' may be implemented in the PDCP module under LTE network architecture. The resource allocation controllers 106, 106' may use the same protocol to communicate with each other.

Figure 3B:
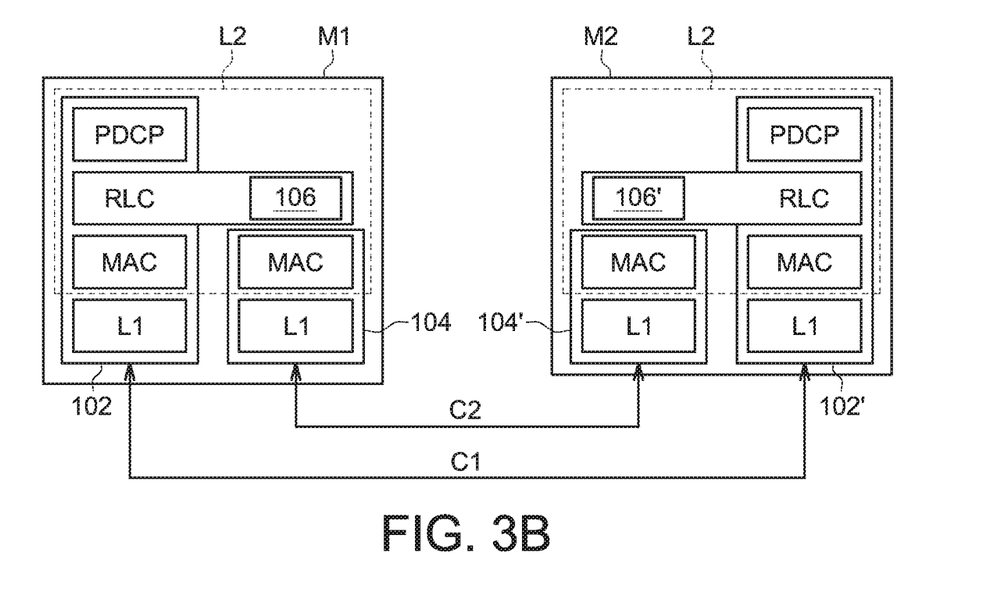
FIG. 3B shows the protocol stack of the wireless communication device according to another embodiment of the present disclosure.

FIG. 3B shows the protocol stack of the wireless communication device M1, M2 according to another embodiment of the present disclosure. The difference between the present embodiment and the embodiment shown in FIG. 3A is that the resource allocation controller 106/106' is implemented in the RLC module under LTE network architecture.

Figure 4:
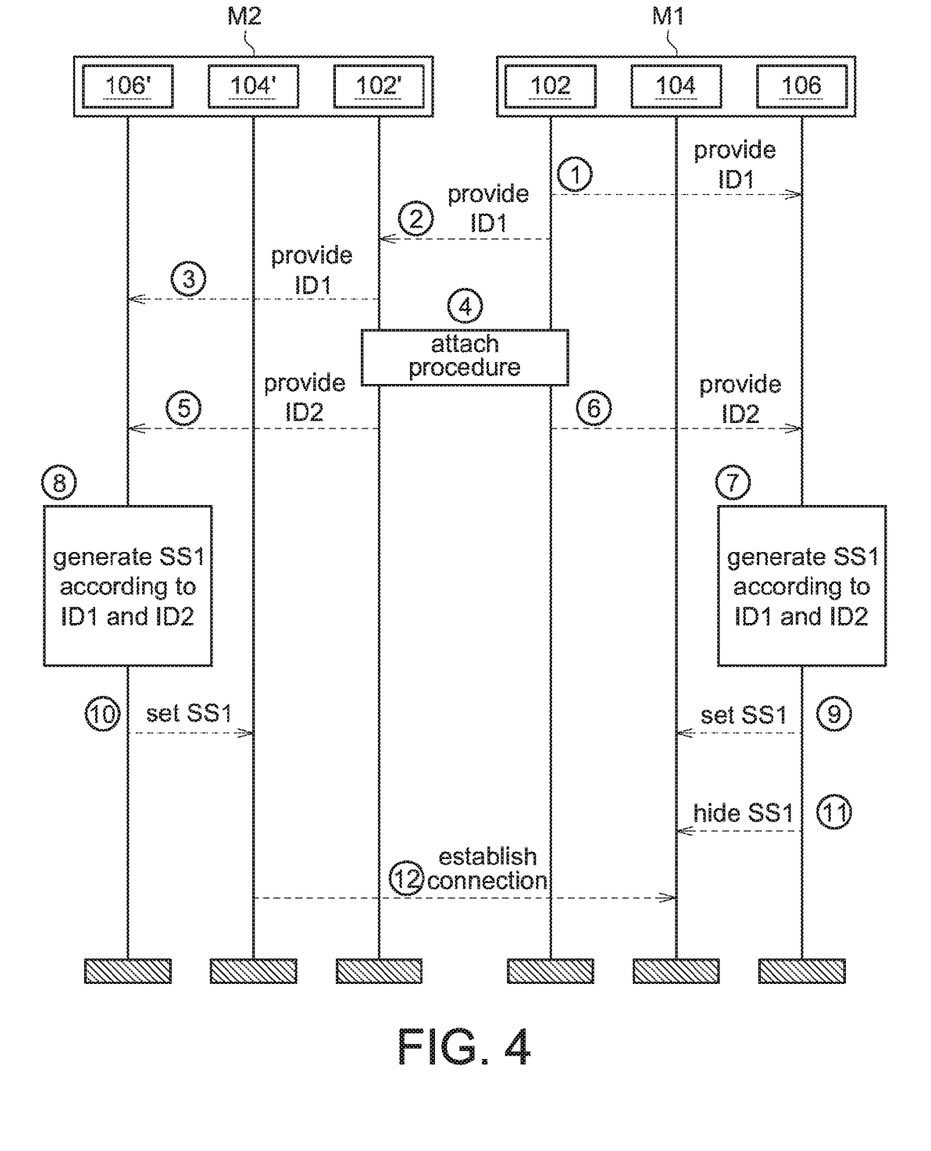
FIG. 4 shows a system flowchart of an example in which the wireless communication devices utilize the base station identification procedure to establish the wireless connection.
Figure 5:
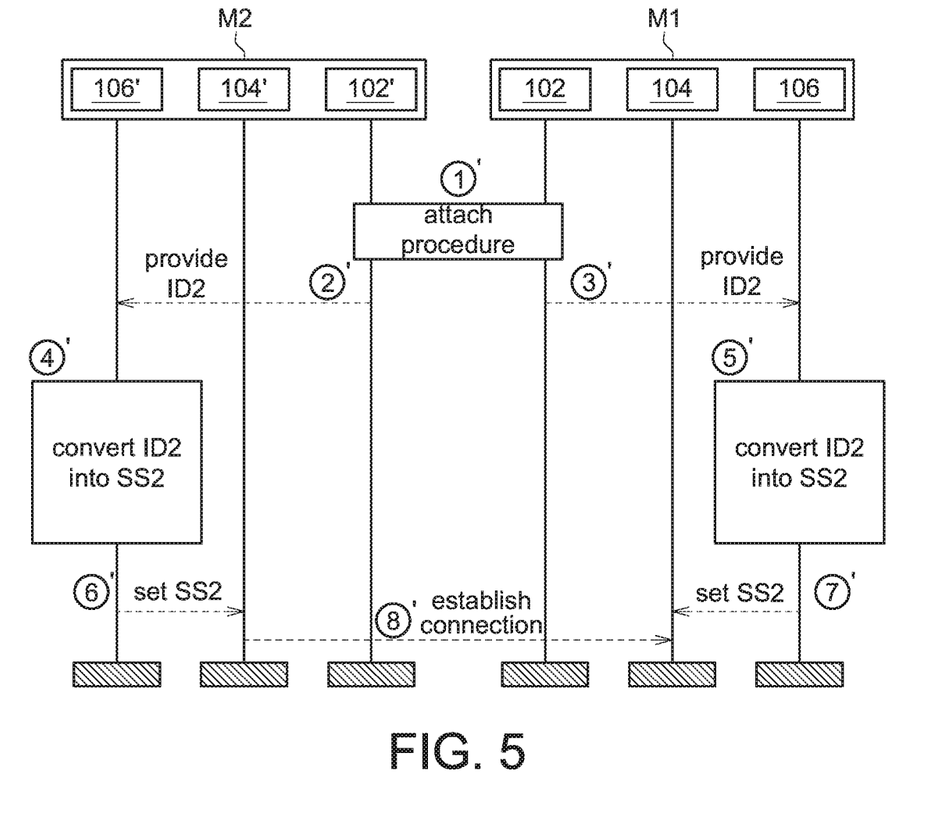
FIG. 5 shows a system flowchart of an example in which the wireless communication devices utilize the UE identification procedure to establish the wireless connection.

In the embodiments of the present disclosure, the wireless communication devices M1, M2 may utilize two stages of procedures: (1) base station identification procedure and (2) UE identification procedure to establish the communication connection. Through the base station identification procedure, both of the wireless communication device M1 (e.g., the base station side) and the wireless communication device M2 (e.g., the UE side) may generate a string of base station (e.g., the identifier of WiFi AP) only known by them, so other irrelevant UE(s) attempting to establishing the communication connection can be prevented from affecting the accessing efficiency of the UE's normal connection. Through the UE identification procedure, the wireless communication device M1 (e.g., the base station side) may determine whether to establish a connection with an UE, so the number of UE connections as well as the UE identity can be controlled and managed.

FIG. 4 shows a system flowchart of an example in which the wireless communication devices M1, M2 utilize the base station identification procedure to establish the wireless connection. At steps 1 and 2, the first wireless transceiving interface 102 of the wireless communication device M1 (the base station side, e.g., an eNB) may provide both of the resource allocation controller 106 and the wireless communication device M2 (UE side) a first identifier ID1 associated with itself. The first identifier ID1 is such as a Cell identifier of the wireless communication device M1.

At step 3, the first identifier ID1 of the wireless communication device M1 is provided to the resource allocation controller 106' of the wireless communication device M2. At steps 4 to 6, the wireless communication device M1 assigns the wireless communication device M2 a second identifier ID2 in an attach procedure. The second identifier ID2 is provided to the resource allocation controllers 106, 106' of the wireless communication devices M1, M2. In an embodiment, the second identifier ID2 is such as a Cell Radio Network Temporary Identifier (CRNTI).

At steps 7 to 10, both of the resource allocation controller 106 of the wireless communication device M1 (base station side) and the resource allocation controller 106' of the wireless communication device M2 (UE side) may generate a string of base station SS1 according to the first identifier ID1 and the second identifier ID2, and set their own second wireless transceiving interface 104/104' by using the generated string of base station SS1. The string of base station SS1 is such as a WiFi AP identifier. Since the resource allocation controllers 106, 106' may utilize the same algorithm to generate the string of base station SS1, the wireless communication device M1 and wireless communication device M2 may obtain the same string of base station SS1.

At step 11, the resource allocation controller 106 hides the string of base station SS1, such that the string of base station SS1 is private to the network. Thus, for an UE not built in a protocol of the proposed resource allocation controller, or not be assigned the second identifier ID2 (e.g., CRNTI), it will not know the string of base station SS1 (e.g., the WiFi AP identifier).

At step 12, the wireless communication device M2 having the string of base station SS1 may build up a connection to the wireless communication device M1 through the second wireless transceiving interface 104' (e.g., WiFi transceiving interface).

In the abovementioned embodiments, when the second wireless transceiving interface 104/104' is overloaded, e.g., the occupancy rate of the WiFi transceiving interface is higher than a threshold, the overloading will cause so many collisions at the transceiving interface due to the contention-based access of WiFi, resulting in a reduction of the packet transmission efficiency. In such circumstance, the wireless communication device M1 may add a barring indicator for second wireless transceiving interface through the first wireless transceiving interface 102, e.g., adding the barring indicator in step 4 of FIG. 4, to prohibit the newly connected UE (e.g., the wireless communication device M2) from accessing the second wireless transceiving interface 104. Further, the wireless communication device M1 may also send the barring indicator to an UE having been accessing the second wireless transceiving interface 104 (e.g., the wireless communication device M2), causing the resource allocation controller 106 of the wireless communication device M1 and the resource allocation controller 106' of the UE to stop transmitting packets through their second wireless transceiving interfaces 104, 104'. In this manner, the loading of the second wireless transceiving interface 104/104' can be reduced and the transmission efficiency of the second wireless transceiving interface 104/104' can be controlled and managed. When the overloading for the second wireless transceiving interface 104/104' is resolved or mitigated, e.g., the occupancy rate of the second wireless transceiving interface 104/104' turns back to be lower than a threshold, the wireless communication device M1 may cancel the barring indicator added at step 4, such that the newly connected UE (e.g., the wireless communication device M2) is allowed to access the second wireless transceiving interface 104 again. Alternatively, the wireless communication device M1 may sends a command for canceling the barring indicator to an UE (e.g., the wireless communication device M2) having been sent the barring indicator, such that the UE is allowed to transmit packets through the transceiving interface (e.g., 104') corresponding to the second wireless transceiving interface 104 again.

FIG. 5 shows an exemplary system flowchart in which the wireless communication devices M1, M2 utilize the UE identification procedure to establish the wireless connection. Steps 1' to 3' in FIG. 5 are similar to steps 4 to 6 in FIG. 4, i.e., the wireless communication device M1 may assign the wireless communication device M2 a second identifier ID2 according to the attach procedure and provide the second identifier ID2 to the resource allocation controller 106, such that the resource allocation controllers 106, 106' of the wireless communication devices M1, M2 obtain the second identifier ID2.

At steps 4' to 7', both of the resource allocation controller 106 of the wireless communication device M1 (base station side) and the resource allocation controller 106' of the wireless communication device M2 (UE side) may generate a string of station SS2, according to the second identifier ID2, to set their own second wireless transceiving interface 104/104'. At step 8', the wireless communication device M2 having the string of station SS2 may establish the communication connection to the wireless communication device M1.

In the abovementioned embodiments, when the second wireless transceiving interface 104/104' is overloaded, the wireless communication device M1 may add a barring indicator for second wireless transceiving interface to restrict a newly connected UE (e.g., the wireless communication device M2) from accessing the second wireless transceiving interface 104. For example, it may add the barring indicator at step 1' in FIG. 5. The wireless communication device M1 may also send the barring indicator to an UE (e.g., the wireless communication device M2) having been accessing the second wireless transceiving interface 104, causing the resource allocation controller 106 of the wireless communication device M1 and the resource allocation controller 106' of the UE to stop transmitting packets through the second wireless transceiving interfaces 104, 104'. In this manner, the loading of the second wireless transceiving interface 104/104' can be reduced and the transmission efficiency of the second wireless transceiving interface 104/104' can be controlled and managed. When the overloading for the second wireless transceiving interface 104/104' is resolved or mitigated, e.g., the occupancy rate of the second wireless transceiving interface 104/104' turns back to be lower than a threshold, the wireless communication device M1 may cancel the barring indicator added at step 1', such that the newly connected UE (e.g., the wireless communication device M2) is allowed to access the second wireless transceiving interface 104 again. Alternatively, the wireless communication device M1 may send a command for canceling the barring indicator to an UE (e.g., the wireless communication device M2) having been sent the barring indicator, such that the UE is allowed to transmit the packets through its transceiving interface (e.g., 104') corresponding to the second wireless transceiving interface 104 again.

In an embodiment, the resource allocation controller 106/106' may set the MAC address of the second wireless transceiving interface 104/104' (e.g., the WiFi transceiving interface) as the string of station SS2. For example, the wireless communication device M1 (base station side) may store the corresponding relationship between each second identifier ID2 and its corresponding MAC address, so the resource allocation controller 106 may decide whether to allow the wireless communication device M2 (UE side) to access the second wireless transceiving interface 104 according to the string of station SS2. Thus, even though an UE has a built-in protocol of the proposed resource allocation controller and is capable of generating, based on the same algorithm at the base station side, the string of station SS2 to set the MAC address to initiate the WiFi connection, the base station still has the authority to accept or reject establishing connection with the UE according to the built-in mapping table.

Based on the above, the proposed wireless communication device and operating method using the same may utilize heterogeneous-network interface control to enable a network being relatively reliable to support another network being relatively less reliable, so the data throughput of a system can be increased, and the service quality for the users can be improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wireless communication device, comprising:
   a first wireless transceiving interface, adapted to a first network architecture;
   a second wireless transceiving interface, adapted to a second network architecture, wherein a connection scheme of the first network architecture is more reliable than that of the second network architecture; and
   a resource allocation controller, transceiving data related to the second wireless transceiving interface selectively through the first wireless transceiving interface or the second wireless transceiving interface according to connection status information associated with the second wireless transceiving interface, wherein
   the resource allocation controller calculates a packet loss rate according to the connection status information,
   when the packet loss rate is larger than or equal to a threshold, the resource allocation controller retransmits data through the first wireless transceiving interface, and
   when the packet loss rate is lower than the threshold, the resource allocation controller retransmits data through the second wireless transceiving interface,
   wherein the first wireless transceiving interface provides a first identifier associated with the wireless communication device to the resource allocation controller and a user equipment (UE), and assigns the UE a second identifier; and
   the resource allocation controller generates a string of base station according to the first identifier and the second identifier, and uses the string of base station to set the second wireless transceiving interface, so as to allow the UE to access the wireless communication device through the second wireless transceiving interface.

2. The wireless communication device according to claim 1, wherein the resource allocation controller hides the string of base station, such that the string of base station is private to a network.

3. The wireless communication device according to claim 1, wherein the resource allocation controller generates a string of station, according to the second identifier, to set the second wireless transceiving interface, and determines whether to allow the UE to access the wireless communication device through the second wireless transceiving interface according to the string of station.

4. The wireless communication device according to claim 1, wherein the wireless communication device receives uplink data from an UE through the first wireless transceiving interface, and transmits downlink data to the UE selectively through the first wireless transceiving interface or the second wireless transceiving interface.

5. The wireless communication device according to claim 1, wherein the first network architecture is a Long Term Evolution (LTE) based network architecture, and the second network architecture is a WiFi based network architecture.

6. The wireless communication device according to claim 5, wherein the first wireless transceiving interface provides a plurality of Data Radio Bearers (DRBs) under the LTE based network architecture, wherein at least one of the DRBs is used to transceive WiFi connection status information or retransmitted WiFi data associated with the second wireless transceiving interface.

7. The wireless communication device according to claim 1, wherein the resource allocation controller is realized by a Packet Data Convergence Protocol (PDCP) module or a Radio Link Control (RLC) module under LTE based network architecture.

8. The wireless communication device according to claim 1, wherein when an occupancy rate of the second wireless transceiving interface is higher than a threshold, the wireless communication device adds a barring indicator for the second wireless transceiving interface through the first wireless transceiving interface, to prohibit an UE from accessing the second wireless transceiving interface.

9. The wireless communication device according to claim 8, wherein when the occupancy rate of the second wireless transceiving interface is lower than the threshold, the wireless communication device cancels the barring indicator to allow the UE to access the second wireless transceiving interface.

10. The wireless communication device according to claim 8, wherein when the occupancy rate of the second wireless transceiving interface is lower than the threshold, the wireless communication device sends a command for canceling the barring indicator to the UE having been sent the barring indicator, such that the UE is allowed to transmit packets through a transceiving interface corresponding to the second wireless transceiving interface.

11. The wireless communication device according to claim 1, wherein when an occupancy rate of the second wireless transceiving interface is higher than a threshold, the wireless communication device sends a barring indicator for the second wireless transceiving interface to an UE having been accessing the second wireless transceiving interface to stop transmitting packets to the UE through the second wireless transceiving interface.

12. The wireless communication device according to claim 11, wherein when the occupancy rate of the second wireless transceiving interface is lower than the threshold, the wireless communication device cancels the barring indicator to allow the UE to access the second wireless transceiving interface.

13. The wireless communication device according to claim 11, wherein when the occupancy rate of the second wireless transceiving interface is lower than the threshold, the wireless communication device sends a command for canceling the barring indicator to the UE having been sent the barring indicator, such that the UE is allowed to transmit packets through a transceiving interface corresponding to the second wireless transceiving interface.

14. A wireless communication device, comprising:
    a first wireless transceiving interface, adapted to a first network architecture;
    a second wireless transceiving interface, adapted to a second network architecture, wherein a connection scheme of the first network architecture is more reliable than that of the second network architecture; and
    a resource allocation controller, transceiving connection status information associated with the second wireless transceiving interface through the first wireless transceiving interface, and transceiving data related to the second wireless transceiving interface selectively through the first wireless transceiving interface or the second wireless transceiving interface,
    wherein when an occupancy rate of the second wireless transceiving interface is higher than a threshold, in response to a barring indicator for the second wireless transceiving interface, the wireless communication device is prohibited from accessing a transceiving interface of a wireless base station which corresponds to the second wireless transceiving interface.

15. The wireless communication device according to claim 14, wherein the first wireless transceiving interface receives a first identifier from a wireless base station, and the wireless base station assigns the wireless communication device a second identifier;
the resource allocation controller generates a string of base station according to the first identifier and the second identifier, and uses the string of base station to set the second wireless transceiving interface, so as to access the wireless base station through the second wireless transceiving interface.

16. The wireless communication device according to claim 15, wherein the resource allocation controller generates a string of station, according to the second identifier, to set the second wireless transceiving interface, and accesses the wireless base station through the second wireless transceiving interface according to the string of station.

17. The wireless communication device according to claim 14, wherein the wireless communication device transmits uplink data to a wireless base station through the first wireless transceiving interface, and receives downlink data from the wireless base station selectively through the first wireless transceiving interface or the second wireless transceiving interface.

18. The wireless communication device according to claim 14, wherein the first network architecture is a Long Term Evolution (LTE) based network architecture, and the second network architecture is a WiFi based network architecture.

19. The wireless communication device according to claim 18, wherein the first wireless transceiving interface provides a plurality of Data Radio Bearers (DRBs) under the LTE based network architecture, wherein at least one of the DRBs is used to transceive WiFi connection status information or retransmitted WiFi data associated with the second wireless transceiving interface.

20. The wireless communication device according to claim 14, wherein the resource allocation controller is realized by a Packet Data Convergence Protocol (PDCP) module or a Radio Link Control (RLC) module under LTE based network architecture.

21. The wireless communication device according to claim 14, wherein when the wireless communication device has been accessing a transceiving interface of a wireless base station which corresponds to the second wireless transceiving interface, and an occupancy rate of the second wireless transceiving interface is higher than a threshold, the wireless communication device stops transmitting packets to the wireless base station through the second wireless transceiving interface in response to a barring indicator for the second wireless transceiving interface.

22. The wireless communication device according to claim 21, wherein when the occupancy rate of the second wireless transceiving interface is lower than the threshold, the wireless communication device is allowed to access the transceiving interface of the wireless base station which corresponds to the second wireless transceiving interface.

23. The wireless communication device according to claim 21, wherein when the wireless communication device has been sent the barring indicator, and the occupancy rate of the second wireless transceiving interface returns to be lower than the threshold, the barring indicator is cancelled, such that the wireless communication device is allowed to transmit packets with the transceiving interface of a wireless base station which corresponds to the second wireless transceiving interface again.

24. The wireless communication device according to claim 14, wherein when the occupancy rate of the second wireless transceiving interface is lower than the threshold, the wireless communication device is allowed to access the transceiving interface of the wireless base station which corresponds to the second wireless transceiving interface.

25. The wireless communication device according to claim 14, wherein when the wireless communication device has been sent the barring indicator, and the occupancy rate of the second wireless transceiving interface returns to be lower than the threshold, the barring indicator is cancelled, such that the wireless communication device is allowed to transmit packets with the transceiving interface of the wireless base station which corresponds to the second wireless transceiving interface again.

26. An operating method of a wireless communication device, comprising:
providing a first wireless transceiving interface adapted to a first network architecture;
providing a second wireless transceiving interface adapted to a second network architecture, wherein a connection scheme of the first network architecture is more reliable than that of the second network architecture; and
transceiving data related to the second wireless transceiving interface selectively through the first wireless transceiving interface or the second wireless transceiving interface according to connection status information associated with the second wireless transceiving interface,
wherein the operating method further comprises:
calculating a packet loss rate according to the connection status information,
when the packet loss rate is larger than or equal to a threshold, retransmitting data through the first wireless transceiving interface,
when the packet loss rate is lower than the threshold, retransmitting data through the second wireless transceiving interface;
providing a first identifier associated with the wireless communication device to a resource allocation controller and a user equipment (UE), and assigning the UE a second identifier;
generating a string of base station according to the first identifier and the second identifier; and
using the string of base station to set the second wireless transceiving interface, so as to allow the UE to access the wireless communication device through the second wireless transceiving interface.

27. The operating method according to claim 26, further comprising:
hiding the string of base station, such that the string of base station is private to a network.

28. The operating method according to claim 26, further comprising:
generating a string of station according to the second identifier to set the second wireless transceiving interface; and
determining whether to allow the UE to access the wireless communication device through the second wireless transceiving interface according to the string of station.

29. The operating method according to claim 26, further comprising:

receiving uplink data from an UE through the first wireless transceiving interface; and transmitting downlink data to the UE selectively through the first wireless transceiving interface or the second wireless transceiving interface.

30. The operating method according to claim 26, wherein the first network architecture is a Long Term Evolution (LTE) based network architecture, and the second network architecture is a WiFi based network architecture.

31. The operating method according to claim 30, further comprising:

providing a plurality of Data Radio Bearers (DRBs) under the LTE based network architecture through the first wireless transceiving interface; and transceiving WiFi connection status information or retransmitted WiFi data associated with the second wireless transceiving interface through at least one of the DRBs.

32. The operating method according to claim 26, further comprising:

when an occupancy rate of the second wireless transceiving interface is higher than a threshold, adding a barring indicator for the second wireless transceiving interface through the first wireless transceiving interface, to prohibit an UE from accessing the second wireless transceiving interface.

33. The operating method according to claim 32, further comprising:

when the occupancy rate of the second wireless transceiving interface is lower than the threshold, canceling the barring indicator to allow the UE to access the second wireless transceiving interface.

34. The operating method according to claim 32, further comprising:

when the occupancy rate of the second wireless transceiving interface is lower than the threshold, sending a command for canceling the barring indicator to the UE having been sent the barring indicator, such that the UE is allowed to transmit packets through a transceiving interface corresponding to the second wireless transceiving interface.

35. The operating method according to claim 26, further comprising:

when an occupancy rate of the second wireless transceiving interface is higher than a threshold, sending a barring indicator for the second wireless transceiving interface to an UE having been accessing the second wireless transceiving interface to stop transmitting packets to the UE through the second wireless transceiving interface.

36. The operating method according to claim 35, further comprising:

when the occupancy rate of the second wireless transceiving interface is lower than the threshold, canceling the barring indicator to allow the UE to access the second wireless transceiving interface.

37. The operating method according to claim 35, further comprising:

when the occupancy rate of the second wireless transceiving interface is lower than the threshold, sending a command for canceling the barring indicator to the UE having been sent the barring indicator, such that the UE is allowed to transmit packets through a transceiving interface corresponding to the second wireless transceiving interface.

38. An operating method of a wireless communication device, comprising:

providing a first wireless transceiving interface adapted to a first network architecture;

providing a second wireless transceiving interface adapted to a second network architecture, wherein a connection scheme of the first network architecture is more reliable than that of the second network architecture;

transceiving connection status information associated with the second wireless transceiving interface through the first wireless transceiving interface;

transceiving data related to the second wireless transceiving interface selectively through the first wireless transceiving interface or the second wireless transceiving interface; and when the wireless communication device has been accessing a transceiving interface of a wireless base station which corresponds to the second wireless transceiving interface, and an occupancy rate of the second wireless transceiving interface is higher than a threshold, stopping transmitting packets to the wireless base station through the second wireless transceiving interface in response to a barring indicator for the second wireless transceiving interface.

39. The operating method according to claim 38, further comprising:

receiving a first identifier from a wireless base station and a second identifier assigned by the wireless base station through the first wireless transceiving interface;

generates a string of base station according to the first identifier and the second identifier; and using the string of base station to set the second wireless transceiving interface, so as to access the wireless base station through the second wireless transceiving interface.

40. The operating method according to claim 39, further comprising:

generates a string of station according to the second identifier to set the second wireless transceiving interface; and accessing the wireless base station through the second wireless transceiving interface according to the string of station.

41. The operating method according to claim 38, further comprising:

transmitting uplink data to a wireless base station through the first wireless transceiving interface; and receiving downlink data from the wireless base station through the second wireless transceiving interface.

42. The operating method according to claim 38, wherein the first network architecture is a Long Term Evolution (LTE) based network architecture, and the second network architecture is a WiFi based network architecture.

43. The operating method according to claim 42, further comprising:

providing a plurality of Data Radio Bearers (DRBs) under the LTE based network architecture through the first wireless transceiving interface; and transceiving WiFi connection status information or retransmitted WiFi data associated with the second wireless transceiving interface through at least one of the DRBs.

44. The operating method according to claim 38, further comprising:

when an occupancy rate of the second wireless transceiving interface is higher than a threshold, in response to a barring indicator for the second wireless transceiving interface, making the wireless communication device be prohibited from accessing a transceiving interface of a wireless base station which corresponds to the second wireless transceiving interface.

45. The operating method according to claim 44, further comprising:

when the occupancy rate of the second wireless transceiving interface is lower than the threshold, making the wireless communication device be allowed to access the transceiving interface of the wireless base station which corresponds to the second wireless transceiving interface.

46. The operating method according to claim 44, further comprising:

when the wireless communication device has been sent the barring indicator, and the occupancy rate of the second wireless transceiving interface returns to be lower than the threshold, making the wireless communication device be allowed to transmit packets with the transceiving interface of the wireless base station which corresponds to the second wireless transceiving interface.

47. The operating method according to claim 38, further comprising:

when the occupancy rate of the second wireless transceiving interface is lower than the threshold, making the wireless communication device be allowed to access the transceiving interface of the wireless base station which corresponds to the second wireless transceiving interface.

48. The operating method according to claim 38, further comprising:

when the wireless communication device has been sent the barring indicator, and the occupancy rate of the second wireless transceiving interface returns to be lower than the threshold, making the wireless communication device be allowed to transmit packets with the transceiving interface of the wireless base station which corresponds to the second wireless transceiving interface.

* * * * *